United States Patent [19]

Calcagni et al.

[11] Patent Number: 4,794,704
[45] Date of Patent: Jan. 3, 1989

[54] HEIGHT LEVEL MEASURING DEVICE

[76] Inventors: Loreto Calcagni, 1094 Ferngate Dr., Franklin Square, N.Y. 11010; Daniel Joyce, 28 Ross Rd., Babylon, N.Y. 11702

[21] Appl. No.: 132,593

[22] Filed: Dec. 14, 1987

[51] Int. Cl.⁴ ............................................. G01C 5/04
[52] U.S. Cl. ............................................................. 33/367
[58] Field of Search ............... 215/311, 17; 33/367; 239/533.13, 533.14; 251/4

[56] References Cited

U.S. PATENT DOCUMENTS

| | | | |
|---|---|---|---|
| 375,450 | 12/1987 | Karr | 33/367 |
| 946,660 | 1/1910 | Deslattes | 33/367 |
| 1,181,926 | 5/1916 | Rooney et al. | 215/311 |
| 1,488,749 | 4/1924 | Franz | 33/367 |
| 2,755,560 | 7/1956 | Spaeder | 33/367 |
| 2,971,264 | 2/1961 | Cowan | 33/367 X |
| 4,651,433 | 3/1987 | Mohr | 33/367 X |
| 4,686,773 | 8/1887 | Brewer | 33/367 |

Primary Examiner—Harry N. Haroian
Attorney, Agent, or Firm—Michael I. Kroll

[57] ABSTRACT

A height level measuring device is provided and consists of an elongated transparent flexible hollow tube with scales at each open end thereof. A predetermined amount of liquid is placed within the tube so that the liquid will seek same height level at both ends no matter what height the ends are raised to, thus allowing height of two objects to be vertically measured when there is an obstacle between the two objects.

4 Claims, 1 Drawing Sheet

U.S. Patent  Jan. 3, 1989  4,794,704
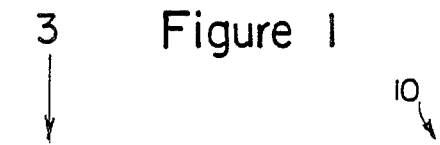
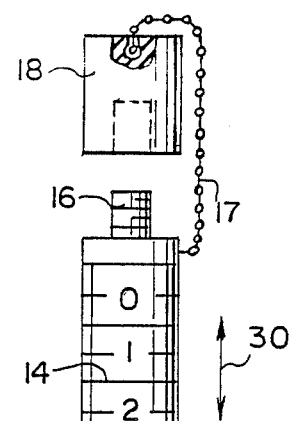
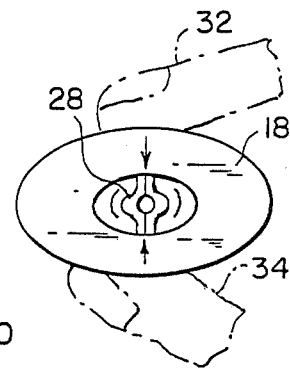
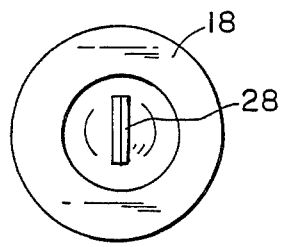
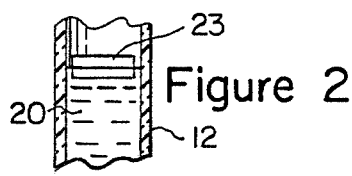
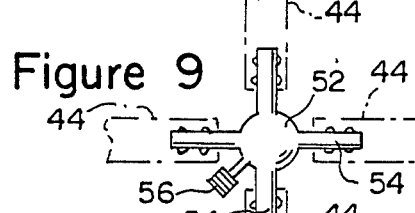
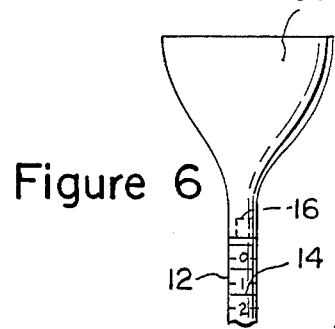
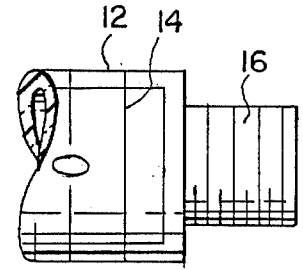
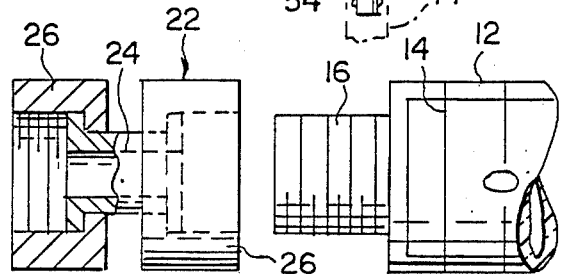
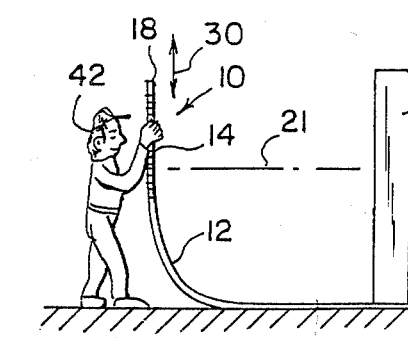
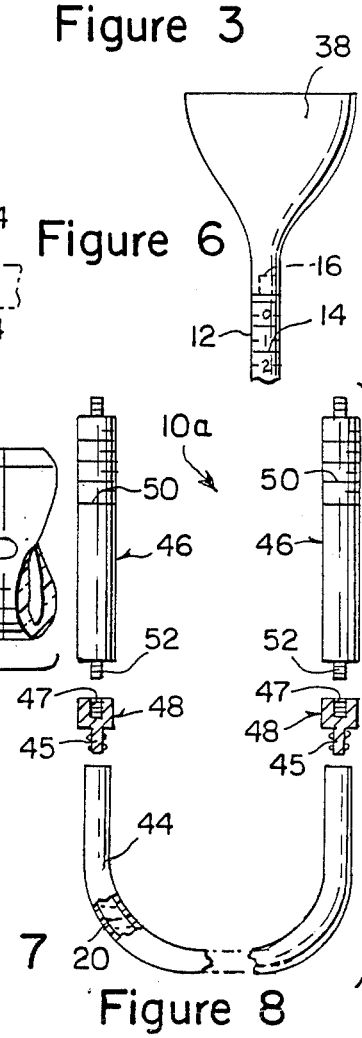

HEIGHT LEVEL MEASURING DEVICE

BACKGROUND OF THE INVENTION

1. Field of the Invention

The instant invention relates generally to tools and more specifically it relates to a height level measuring device.

2. Description of the Prior Art

Numerous tools, such as transit levels have been provided in prior art that are adapted to measure horizontal and vertical angles, leveling, setting building lines, checking elevation and plumbing. While these units may be suitable for the particular purpose to which they address, they would not be as suitable for the purposes of the present invention as heretofore described.

SUMMARY OF THE INVENTION

A primary object of the present invention is to provide a height level measuring device that will overcome the shortcomings of the prior art devices.

Another object is to provide a height level measuring device that can measure the relative elevation of two objects when there is an obstacle therebetween.

An additional object is to provide a height level measuring device that utilizes liquid within a clear tube in which in the law of physics, the liquid will always seek the same height level at both ends of the tube no matter what height the ends are raised to.

A further object is to provide a height level measuring device that is simple and easy to use.

A still further object is to provide a height level measuring device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is an elevational view with parts broken away of the invention.

FIG. 2 is a fragmentary sectional view showing a float therein.

FIG. 3 is a top view taken in direction of arrow 3 in FIG. 1 showing the air valve closed.

FIG. 4 is a top view similar to FIG. 3 showing the air valve opened.

FIG. 5 is an exploded view with parts broken away of a connector between two tubes.

FIG. 6 is an elevational view of a filler funnel attached to one end thereof.

FIG. 7 is an elevational view showing the typical invention in use.

FIG. 8 is an exploded view of another embodiment of the invention.

FIG. 9 is an elevational view of a multiple tube connector.

DETAILED DESCRIPTION OF THE PREFERRED EMBODIMENTS

Turning now descriptively to the drawings, in which smilar reference characters denote similar elements throughout the several views, FIGS. 1 and 7 illustrate a height level measuring device 10 consisting of an elongated transparent flexible hollow tube 12 having an opening at each end. A pair of matching scales 14 are each disposed onto the tube 12 near one end thereof. A predetermined amount of liquid 20, such as clear or colored water or antifreeze, is placed within the tube 12 so that, because of the law of physics the liquid 20 will seek same height level 21 at both ends of the tube 12 no matter what height the ends are raised to as indicated by arrows 30, by persons 40 and 42, thus allowing height of two objects (not shown) to be vertically measured by the scales 14 with respect to the liquid 20 when there is an obstacle 36 between the two objects.

A pair of male couplings 16 are each affixed to one end of the tube 12. As best seen in FIGS. 3 and 4, a pair of flexible air valves 18 are provided that have mating flap members 28. Each of the air valves 18 are removably disposed onto one of the male couplings 16 to be manually squeezed between two fingers 32 and 34 so that that flap members 28 of the air valve 18 will open to allow air to enter the tube 12 to level out the liquid 20 therein. A chain 17 between each end of the tube 14 and each of the air valves 18 can prevent the loss of the air valves. A pair of floats 23, one of which is shown in FIG. 2, are each disposed into one end of the tube 12 so as to be easily seen when reading the scales 14 on the tube 12.

FIG. 5 shows a connector joint 22 being in two swiveling segments via a hollow swivel shaft 24, each having a female coupling 26 so as to removably engage with one male coupling 16 from two different tubes 12 to increase length of the measuring device 10.

FIG. 6 shows a filler funnel 38 which can be removably disposed onto one of the male couplings 16 for easily filling the liquid 20 into the tube 12.

A modified height level measuring device 10a is illustrated in FIG. 8 consisting of an elongated flexible hollow tube 44. A pair of connectors 48 are provided, each having a male plug 45 and a female threaded socket 47 thereon. The male plug 45 fits into one end of the tube 44. A pair of transparent tube segments 46, each have a scale 50 thereon and a male threaded coupling 52 at one end to engage with the female threaded socket 47 of one of the connectors 48. A predetermined amount of liquid 20 is placed within the device 10a so that because of the law of physics the liquid 20 will seek same height level at distal ends of the tube segments 46 no matter what height the ends are raised to thus allowing height of two objects to be vertically measured by the scales 50 with respect to the liquid 20 when there is an obstacle 36 (see FIG. 7) between the two objects.

In FIG. 9 a multiple tube connector 52 is shown having a plurality of male plugs 54 to fit into ends of a number of tubes 44 and a threaded male coupling to connect to a hose (not shown) for filling the tubes 44 with liquid 20.

LIST OF REFERENCE NUMBERS

10. Height Level Measuring Device
10a. Modified Height Level Measuring Device
12. Elongated Transparent Flexible Hollow Tube
14. Scales
16. Male Couplings
17. Chain
18. Flexible Air Valves
20. Liquid 21. Height Level
22. Connector Joint
23. Float
24. Hollow Swivel Shaft
26. Female Coupling
28. Flap Members
30. Arrows
32. Finger
34. Finger
36. Obstacle
38. Filler Funnel
40. Person
42. Person
44. Elongated Flexible Hollow Tube
45. Male Plug
46. Transparent Tube Segments
47. Female Threaded Socket
48. Connectors
50. Scale
52. Multiple Tube Connector
54. Male Plugs
55. Threaded Male Couplings It will be understood that each of the elements described above, or two or more together, may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A height level measuring device which comprises:
   (a) an elongated transparent flexible hollow tube having an opening at each end;
   (b) a pair of matching scales, each disposed onto said tube near one end thereof;
   (c) a predetermined amount of liquid placed within said tube so that because the law of physics said liquid will seek same height level at both ends of said tube no matter what height the ends are raised to thus allowing height of two objects to be vertically measured by said scales with respect to said liquid when there is an obstacle between the two objects;
   (d) a pair of male couplings, each affixed to one end of said tube; and
   (e) a pair of flexible air valves having mating flap members, each of said air valves removably disposed onto one of said male couplings to be manually squeezed between two fingers so that the flap members of said air valve will open to allow air to enter said tube to level out said liquid therein.

2. A height level measuring device as recited in claim 1, further comprising a pair of floats, each disposed into one end of said tube so as to be easily seen when reading said scales on said tube.

3. A height level measuring device as recited in claim 2, further comprising a connector joint being in two swiveling segments, each having a female coupling so as to removably engage with one male coupling from two different tubes so as to increase length of said measuring device by combining said two different tubes.

4. A height level measuring device as recited in claim 3, further comprising a filler funnel which can be removably disposed onto one of said male couplings for easily filling said liquid into said tube.

* * * * *